United States Patent [19]

Kühn et al.

[11] Patent Number: 5,500,845
[45] Date of Patent: Mar. 19, 1996

[54] RESILIENT SCANNING HEAD SUPPORT MADE OF DEFORMABLE MATERIAL

[75] Inventors: Hans-Robert Kühn, St. Georgen; Dieter Storz, Lauterbach; Engelbert Läufer, St. Georgen; Peter Hoch, Triberg; Friedrich Füldner, Villingen-Schwenningen, all of Germany

[73] Assignee: Deutsche Thomson-Brandt GmbH, Villingen-Schwenningen, Germany

[21] Appl. No.: 211,874

[22] PCT Filed: Oct. 21, 1992

[86] PCT No.: PCT/EP92/02406

§ 371 Date: Jul. 21, 1994

§ 102(e) Date: Jul. 21, 1994

[87] PCT Pub. No.: WO93/09534

PCT Pub. Date: May 13, 1993

[30] Foreign Application Priority Data

Oct. 31, 1991 [DE] Germany .................. 41 35 908.9

[51] Int. Cl.⁶ .................................................. G11B 7/00
[52] U.S. Cl. ............... 369/112; 369/44.15; 369/44.16
[58] Field of Search .................... 369/44.14, 44.15, 369/44.16, 112

[56] References Cited

U.S. PATENT DOCUMENTS

| | | | |
|---|---|---|---|
| 4,482,986 | 11/1984 | Noda et al. | 369/112 |
| 4,718,050 | 1/1988 | Kurz et al. | 369/44.16 |
| 5,072,433 | 12/1991 | Tanaka | 369/44.16 |
| 5,206,762 | 4/1993 | Kasahara et al. | 369/44.15 |
| 5,208,703 | 5/1993 | Ikegame et al. | 369/44.15 |

FOREIGN PATENT DOCUMENTS

| | | | |
|---|---|---|---|
| 178077B1 | 11/1989 | European Pat. Off. | G11B 7/08 |
| 0358294 | 3/1990 | European Pat. Off. | |
| 0379757 | 8/1990 | European Pat. Off. | |
| 0412556 | 8/1990 | European Pat. Off. | |
| 0464912 | 6/1991 | European Pat. Off. | |
| 2645326 | 4/1977 | Germany . | |
| 3234288 | 7/1984 | Germany | G11B 7/08 |
| WO91/01549 | 2/1991 | Germany | G11B 7/08 |
| 59-218640 | 12/1984 | Japan . | |
| 9101549 | 2/1991 | WIPO . | |

OTHER PUBLICATIONS

Patent Abstracts Of Japan, vol. 9, No. 90, 19 Apr. 1985, (Seiko Denshi Kogyo K.K.) and Japan Pat. 59–218640 (Listed above).

*Primary Examiner*—Georgia Y. Epps
*Assistant Examiner*—Kim-Kwok Chu
*Attorney, Agent, or Firm*—Joseph S. Tripoli; Eric P. Herrmann

[57] ABSTRACT

A resilient scanning or recording head support made of deformable material comprising a resilient molded part being step like shaped and resiliently deformable in at least one direction and/or through an angle. This construction accommodates deflection of the scanning head analogously to a parallel guide, in a straight line as well as through at least one angle deviating from the preferred directions of the parallel guide.

10 Claims, 7 Drawing Sheets

RESILIENT SCANNING HEAD SUPPORT MADE OF DEFORMABLE MATERIAL

BACKGROUND OF THE INVENTION

The invention relates to an actuator arrangement for the scanning and/or recording of items of information on recording media. An arrangement, which is provided for fine- or follow-up control or regulation and with which a scanning and/or recording head is positioned in its location with respect to the recording medium, will be referred to as the actuator arrangement. The actuator is a component, in the output section of a control or regulating path, which has a decisive influence on the energy or earth currents and which acts therein as a variable resistance. Actuators are used in, amongst others, optical and magneto-optic recording and reproducing devices such as for example, CD players, in which items of information are scanned from a rotating recording medium, the CD disc, by means of a light beam. An exact positioning of the scanning means is required since even small deviations in the position of the scanning and/or recording head relative to the recording medium lead to losses of information and functional errors. For the reproduction of signals stored on an information carrier, such as for example, pictures and sound in a video disc player, sound in a CD player or data items of a magneto-optic disc, in addition to an exact focusing of the light beam on the disc, a precise guidance along the data track is also required whereby the actuator has to be guided as parallel and as perpendicular to the plane of the disc as possible. The guidance should be smooth and the actuator should exhibit a low mass so that even tiny displacement forces are sufficient for the regulation and a high regulating speed is ensured. On the other hand, the position of the actuator perpendicular to the plane of the disc should be as stable as possible so that vibrations, caused by external influences for example, do not disadvantageously affect the scanning or recording process and the scanning and/or recording head.

A reading head for the reading of information recorded as a track or as tracks on a recording medium which is moved relative thereto, is already known c.f. DE 26 45 326 C2. In this reading head, which has an objective lens for projecting a light point onto the surface of the recording medium, a scanning device for scanning the relative position between the objective lens and the track and for generating a tracking error signal and a focusing error signal, an objective lens carrier which is movable in a first direction parallel to the axis of the objective lens and is attached to the reading head via a compliant support and which is controllable in this first direction by the focusing error signal by means of a focusing coil arrangement and which also has a track following device by means of which the light point is adjustable by the tracking error signal perpendicularly to the objective lens axis and perpendicularly to the track in a second direction, resilient elements are used as the support for the objective lens carrier, which elements are mounted in the form of a helix having the axis of the objective lens as the central axis or symmetrically with respect to the axis of the objective lens and to the second direction. The support for the objective lens carrier is thus also compliant in a second direction perpendicular to the axis of the objective lens and the track following device is constructed, in known manner, as an electromagnetic adjusting device whose movable part is attached to the objective lens carrier and whose fixed part is attached to the reading head. In addition to the track following device, there is provided a further electromagnetic adjusting device whose movable part is attached to the objective lens carrier and whose static part is fixed to the reading head and the resilient elements are so constructed that the support for the objective lens carrier is adjustable by a time base error signal in a third direction perpendicular to the axis of the objective lens and parallel to the track. The support for the objective lens carrier has an intermediate part which is attached to the reading head via a first resilient element that is compliant in a first direction and to which, the movable part of the track following device is attached via a second resilient element that is compliant in the second direction. The first resilient element is formed by leaf springs and the second resilient element by flexible wires which are tensioned between the movable part and the objective lens carrier. In this connection, it was further proposed to use a helical spring which was compliant in every direction as the resilient element or curved spring bars which were compliant in every direction as the resilient elements. The underlying object of developing a reading head of the type referred to, in which the movable parts are constructed to be very light and thus can be very quickly adjusted and in which nevertheless, it is ensured that the axis of the objective lens maintains its spatial orientation insofar as possible, is only inadequately achieved since, in particular, the four resilient wires, on which the tubular objective lens carrier is hung via a holder carrying the coils of the deflecting system and the round plate, which is attached to the base via leaf springs and to which the resilient wires are attached, form a system which is inclined to oscillate and which can be easily excited by the rotating recording medium or external influences. This is likewise applicable for a spiral spring or a helical spring as well as for the three dimensionally curved bars forming a spring. In particular the compliant support of the objective lens carrier by spiral or helical springs is disadvantageous in that suspensions of this type are not symmetrical on all sides so that a deflection in an additional direction is simultaneously associated with its deflection in one direction, which is not desirable. This results from the adjusting force effective on the objective lens carrier not being directly effective but rather being effective via an appropriate magnetic field on the objective lens carrier which is movable relative freely in space and which exhibits further degrees of freedom, so that, contingent upon the asymmetry of the suspension, and in the course of the contactless deflection, a deflection direction is set up that does not coincide with the direction of the deflecting force. It is disadvantageous furthermore, that the actuator arrangement is made up of a multiplicity of parts of different materials whose manufacture and assembly necessitates very careful, mechanically detailed work which represents a high expenditure.

In accordance with the EP-A 0 178 077, an optical scanning device is known whose objective lens is attached to a frame by means of four parallel leaf springs which are deflectable in the direction of the optical axis—perpendicular to the surface of the disc—and which are referred to as focusing springs. The frame is connected to a fixed part of the housing via four further parallel leaf springs whose vibration plane is at right angles to the plane of vibration of the four focusing springs. The vibration plane of the leaf springs referred to as focusing springs lies parallel to the surface of the disc. This actuator arrangement is likewise disadvantageous in that it is made up of a multiplicity of parts of different materials and, due to the use of leaf springs, is readily inclined to oscillate. Eight leaf springs are required in order to enable deflection movements in two directions of vibration. Since the planes of vibration or deflection should be exactly perpendicular to one another, the manufacture and assembly of the parts necessitates high precision.

Deflection movements which are only nearly linear are achieved since the deflection of a spring parallelogram attached to a stationary body leads to a curved movement.

Furthermore, a scanning device is known, c.f. DE 39 24 190 A1, which merely requires two holding devices, as opposed to eight leaf springs, for the realisation of the two directions of deflection. These holding devices are attached at one end to two opposite sides of the scanning device or of a part of the scanning device and the other end is mounted on a fixed holder. Each holding device is built up from two end sections, two intermediate sections and at least one mid section which are connected together by hinges. The parallel axes of rotation of the two outer hinges, which connect the end sections to the intermediate sections, are perpendicular to the parallel axes of rotation of the two inner hinges, which connect the mid section to the intermediate section. The holding device is made in one piece from synthetic material, in which notches at the hinge points form yield points that serve as hinges. Due to the use of parallel guides, actuator movements both perpendicular to as well as parallel to the plane of the disc are made possible. These parallel movements provided for the focusing and the track following are usually adequate for CD players. However, without this entailing an expensive adjustment procedure, the perpendicular and parallel alignment of the actuator arrangement relative to the plane of the disc is crucially determined by the dimensional stability of the sections of synthetic material. Manufacturing tolerances and high ambient temperatures which lead to distortions thus act disadvantageously on the precision of the actuator guidance.

In general, high and substantially differing ambient temperatures such as occur for example, during operation in motor vehicles, have a disadvantageous effect on actuator arrangements which incorporate parallel guides and, due to the parallel guidance, they are not correctable in every direction relative to the recording medium. Internal tensions in actuator arrangements made up of different materials and, for parts of synthetic material, their deformation, lead to changes which, due to distortion or a twisting of the actuator arrangement in particular, manifest themselves as angular deviations.

An actuator arrangement is already known whose spatial positioning with respect to the information carrier can be constantly corrected by means of a manoeuvering device c.f. DE 32 34 288 C2. It is constructed without any mechanical guides and the objective lens carrier is freely suspended in a magnetic field. The objective lens carrier consists of a permanent magnetic sleeve which is provided with magnetic poles and there are two sets of coils each having at least three coils arranged in the outer back-circuit field of the permanent magnetic sleeve. The coil fields at the axial ends of the sleeve thereby exert an effect in three directions which are perpendicular to one another in accordance with the way they are controlled. Furthermore, the coils are positioned in such a way that two torques are generated in an axis perpendicular to the axis of the objective lens. It is disadvantageous that a large air gap is required between the movable actuator and the static parts in order to avoid mechanical contact of the responsive objective lens carrier with fixed parts of the actuator arrangement. The arrangement thus exhibits only a low efficiency and large demands must be placed on the precision of the electromagnetic fields so that deviations resulting from a lack of symmetry do not lead to contacts. Six coils and correspondingly expensive control and regulating devices are needed in order to compose the desired three forces in the direction of the co-ordinate axes and the two torques from the six individual forces. The regulation of the location of the objective lens carrier that is freely suspended in the magnetic field requires a large outlay and the mass of the movable permanent magnetic sleeve that is freely suspended in the magnetic field is disadvantageous in that vibrations lead to an undesired deflection. Moreover, damage to the objective lens carrier can occur during transportation in the off state due to a lack of damping.

SUMMARY OF THE INVENTION

The object of the invention is therefore, to develop an actuator arrangement which does away with the deficiencies of the known state of the art.

The invention is based on the following facts and perceptions. Whilst up to now, either a direct connection between the objective lens carrier and a base plate was either completely dispensed with or this was formed by resilient elements or hinges, a resilient moulded part is now proposed in accordance with the invention as a compliant support, which moulded part makes both a mechanical guidance as well as a desired deflection possible. The carrier accommodating the scanning and/or recording head thereby achieves a mobility or deflectibility corresponding to the desired deflection directions and deflection angles which corresponds to that of an objective lens carrier that is freely movable in the magnetic field. In a surprising manner, only a number of active manoeuvering means, which coincides with the number of linear deflection directions that are provided independently of one another and deflection angles, then has to be provided for the control or regulation of the location of the carrier accommodating the scanning and/or recording head or of an objective lens carrier. In contrast to the six coils of an objective lens carrier formed by a permanent magnetic sleeve and freely suspended in the magnetic field, only five coils are now required in order to ensure a deflectibility both in the three linear deflection directions as well as through the two deflection angles.

The design of the resilient moulded parts is provided in correspondence with the desired damping characteristic, in particular at the limit positions, which should prevent a hard impact of the scanning and/or recording head on stationary parts of the arrangement and, in dependence on the type of attachment of the resilient moulded parts to the carrier and to the base plate. Preferably, a step-like design of the resilient moulded part connects the base plate and carrier together via two steps. Thereby, the connection of the resilient moulded part occurs with the base plate, at the anchorage of the kick-part of the step and with the carrier which accommodates the scanning and/or recording head, at the suspension of the tread of the step formed by the resilient moulded part. Two resilient moulded parts, which are preferably arranged symmetrically of the scanning and/or recording head, ensure its deflectibility both in directions parallel to the recording medium, which include an angle of ninety degrees to each other, as well as in the planes which these directions together with a respective perpendicular one form, and also in the direction of these perpendicular ones. The guidance is smooth in the deflection region, is damped, in particular in the limit positions, and forms lower mass components, which are to be accelerated in connection with the deflection, in comparison with a parallel guide.

For the deflection in three directions and for forming two torques, which serve for the deflection through an angle, five coils are provided which are separately controlled by a control or regulating device and are attached to the carrier accommodating the scanning and/or recording head opposite to an arrangement of permanent magnets. The control signals required for the deflection in one direction or through one angle have as great a decoupling as possible from the control range of the other signals that determine the position of the carrier, whereby the expenditure for the control means is reduced vis a vis an objective lens carrier that is freely suspended in the magnetic field.

For the deflection perpendicular to the recording medium, there is provided a coil and for the deflections parallel to the recording medium, there are provided two respective coils which, on the one hand, make a linear guidance possible and, on the other hand, by using a different manner of control, are simultaneously used for the setting of the angle by formation of a torque.

These advantageous effects can also be achieved with four resilient moulded parts or with resilient moulded parts that deviate from a step-like design. Moreover, resilient moulded parts may, in advantageous manner, be combined with a parallel guide corresponding to the DE 39 24 190 A1 into a compliant support since variations caused during manufacture and alterations ensuing from changing and high ambient temperatures can be corrected so that the demands on the dimensional stability and the stability of the shape of the individual parts are diminished and an adjustment becomes superfluous or can be carried out automatically.

This is applicable both for actuator arrangements having scanning and recording heads regulated in dependence on the location or the position of the recording medium as well as for actuator arrangements whose deflection directions are oriented along the axis of the turn-table which receives the recording medium.

The invention is utilisable for CD players, video disc players and also for actuator arrangements deviating therefrom, with which precise fine-positionings have to be undertaken and will be explained in more detail hereinafter by means of embodiments with the help of the drawings.

BRIEF DESCRIPTION OF THE DRAWING

FIG. 1 (a) and FIG. 1 (b) are two views of a first actuator arrangement having resilient moulded parts F1, F2 in a side and top view without manoeuvering means, FIG. 2 (a) to 2 (c) are pictorial diagrams for different deflections by active manoeuvering means, FIG. 3 a sketch for the definition of deflection directions of the actuator relative to the recording medium AT, FIG. 4 a sketch of a second actuator arrangement having resilient moulded parts F1 . . . F4, FIG. 5 (a) to 5(e) are examples of the design of the resilient moulded parts, FIG. 6 a sketch of a third actuator arrangement on the basis of a parallel guide, FIG. 7 a sketch of a fourth actuator arrangement having resilient moulded parts exhibiting notches, FIG. 8 a sketch of a fifth actuator arrangement constructed from a resilient moulded part F and manoeuvering means, FIG. 9 a circuit arrangement for the control of the actuator arrangement given in FIG. 8.

DETAILED DESCRIPTION

Figure 3:
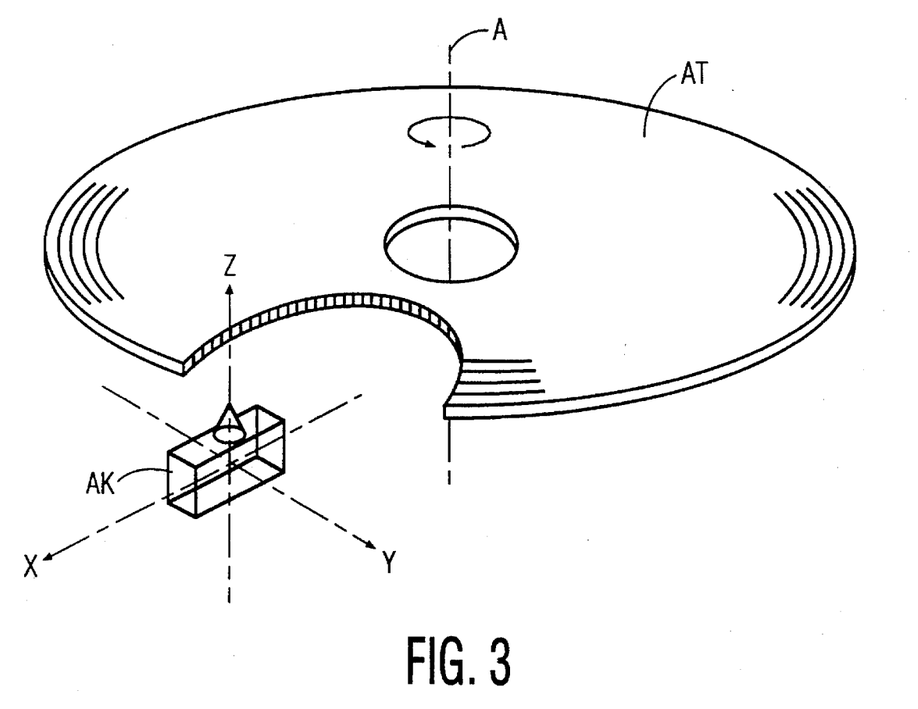

A definition of reference locations between the recording medium AT and the scanning and/or recording head AK in accordance with FIG. 3 precedes the description of various embodiments of the invention and this is used consistently as the basis for the further embodiments. References relating to the same objects are likewise used coincidentally in the Figures.

In correspondence with FIG. 3 and using a crossing of coordinates which is based on the centre of the scanning and/or recording head AK, there are defined, a focusing direction z directed perpendicularly to the recording medium AT, a radial direction x running parallel to the recording medium AT and perpendicularly to the information track of the recording medium AT as well as a tangential direction y running parallel to the recording medium AT and along the information track. The recording medium AT rotates, as indicated by a circular arrow, about an axis A, which represents the axis A of the turn-table receiving the recording medium AT.

Figure 1A:
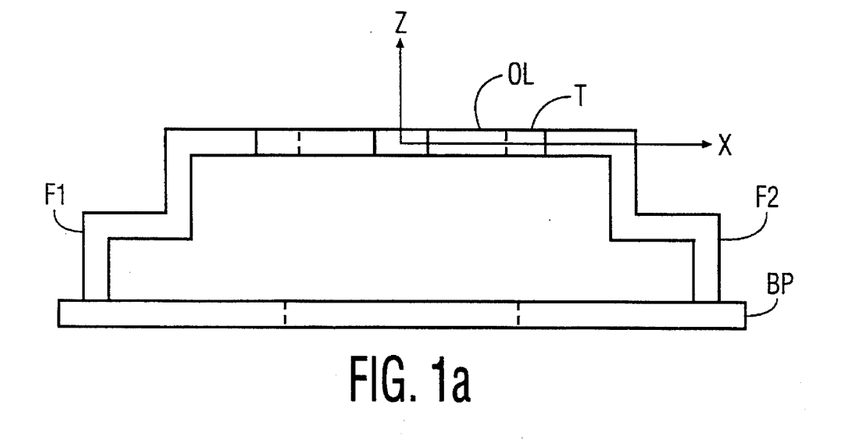
Figure 1B:
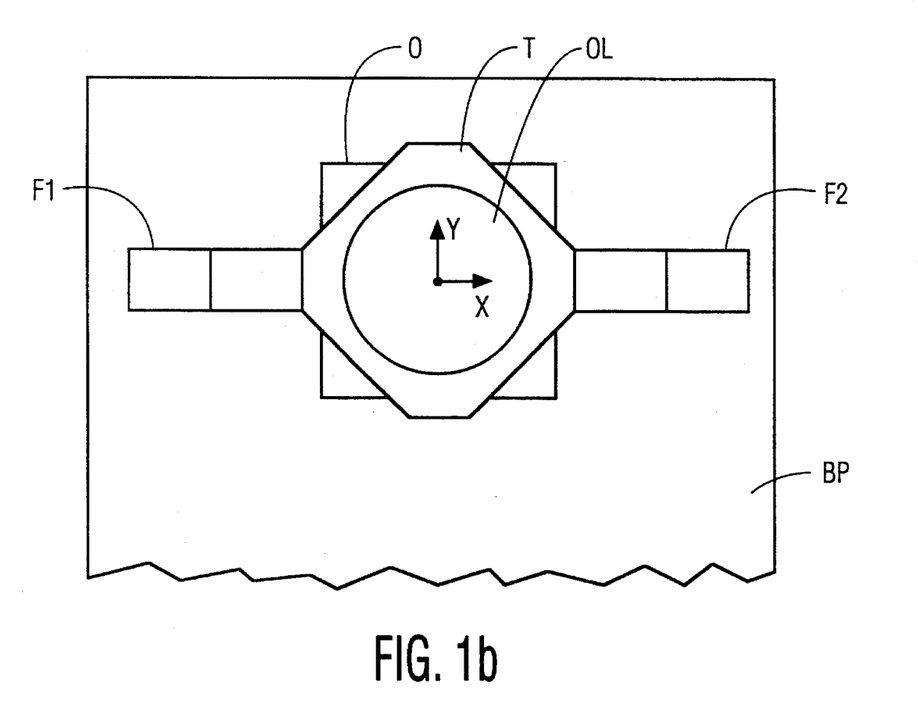
Figure 2A:
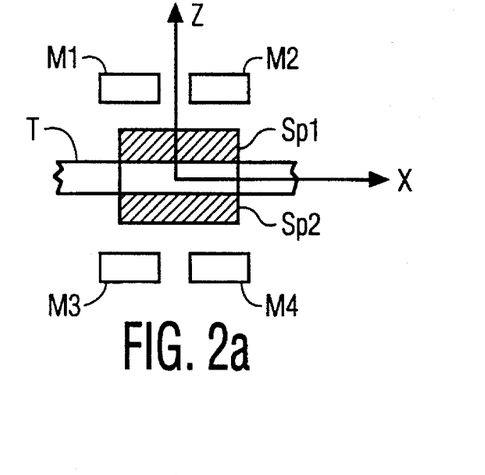
Figure 2B:
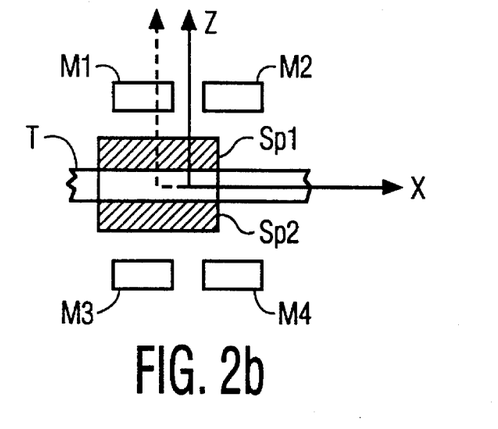
Figure 2C:
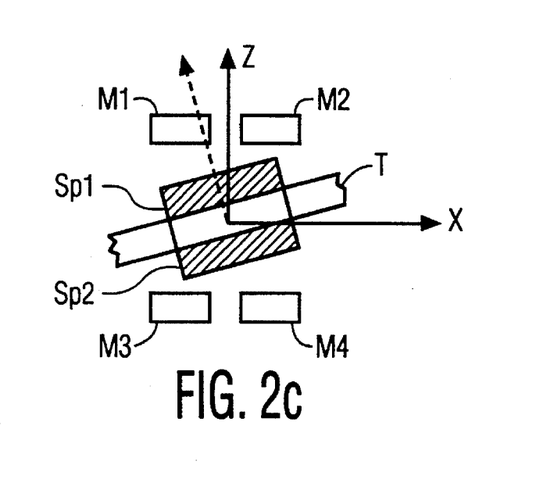

In a first embodiment of the invention in accordance with FIG. 1 and FIG. 2, the scanning and/or recording head AK is an objective lens OL that is accommodated by a carrier T which, in accordance with the invention, is supported via resilient moulded parts F1, F2 on a base plate BP that serves for the coarse positioning of the objective lens OL. In correspondence with FIG. 1, the resilient moulded parts F1, F2 are synthetic material sections which are fashioned in step-like manner, are elastically deformable in every direction and exhibit a damping characteristic which, in the desired deflection range, serves in the first place, to avoid self resonances of the vibration barrier and, in the limit positions of the deflection range, prevents a contact of the objective lens OL, or of the carrier accommodating the objective lens OL, with the base plate BP or any other stationary parts. The step-like fashioned, moulded parts F1, F2 are arranged symmetrically with respect to the objective lens OL and to the carrier accommodating the objective lens OL at its centre and are also attached to opposite truncated corners of the rectangular carrier T. The connection to the carrier T is provided at the respective suspension of the tread of the steps formed by the resilient moulded parts F1, F2. On the other hand, the step-like moulded parts F1, F2 are respectively supported on the base plate BP by the anchorage of the kick-part of the step or are connected to the base plate BP. The objective lens OL is positioned centrally over an opening O provided in the base plate BP and the individual parts are connected to each other by interlocking catch means, so-called snap-in connections, in a manner that is not illustrated. Likewise not illustrated in FIG. 1, were the manoeuvering means with which the deflection of the objective lens OL in the focusing direction z, radial direction x, tangential direction y and in the direction of the planes, which the radial direction x as well as the tangential direction y form with the focusing direction z, is effected. Coils Sp, which are arranged opposite the permanent magnets M and are inserted in the carrier T, are provided as active manoeuvering means. The deflection in the focusing direction z occurs in a known and not illustrated manner by means of a coil whose axis coincides with the optical axis of the objective lens OL and which has a diameter that corresponds at least to the diameter of the objective lens OL. For the deflection of the objective lens OL in the tangential direction y and in the radial direction x as well as through angles within the planes which these directions x, y form with the focusing direction z, there are provided two coil pairs which are arranged at right angles to each other and are formed by respective individually controllable coils Sp1, Sp2, of which one coil pair is illustrated in FIG. 2. The coils Sp1, Sp2 forming one coil pair are arranged parallel to one another and respectively parallel to a pair of oppositely disposed permanent magnets M1 ... M4 that are statically fixed to the base plate BP. The coils Sp1, Sp2 are arranged, as illustrated in FIG. 2, at outer sides on the carrier T with their axes parallel to the plane of the carrier T in the direction of deflection and the adjacently located permanent magnets M1, M2 and M3, M4 forming a respective pair exhibit the same magnetic poles on their oppositely located sides. In correspondence with FIG. 2, the arrangement is built up symmetrically and the active manoeuvering means provided as coils Sp1, Sp2 lead to a linear deflection when controlled in a similar sense in correspondence with FIG. 2b and to a twisting or to an angular deflection of the carrier T and of the objective lens OL when controlled in opposite senses in correspondence with FIG. 2c. By superimposing the control signals, both a linear deflection as well as a deflection through an angle are achieved. The symmetry of the resilient moulded parts thereby ensures that the deflection direction coincides with the direction of the deflecting force. The first coil pair is provided for the deflection in the radial direction x and through an angle in the plane formed by the radial direction x and the focusing direction z, and the second coil pair is provided for the deflection in the tangential direction y and through an angle in the plane formed by the tangential direction y and the focusing direction z. The actuator, which is formed here by an objective lens OL, is deflectable in three linear directions and in two angular directions with only five coils that are controllable independently of one another. Using the resilient moulded parts F1, F2, the carrier T thus has at its disposal a mechanical guide and also it is deflectable in the desired directions. The compliant support by the resilient moulded parts F1, F2 is effective against vibrations and prevents a contact of the actuator with a stationary part and the control voltages and currents required for the deflection have a simple relationship to a deflection which is to be carried out whereby an exceptional decoupling between individual adjustment forces is achieved, which forces on the other hand, can be superimposed so that the outlay required for the control is very small. The method given in DE 40 28 703, with which the regulating signals required for the perpendicular positioning of the actuator relative to the recording medium AT are made available, can be used for the optimum positioning of the actuator or of the objective lens OL relative to the recording medium AT.

Figure 4:
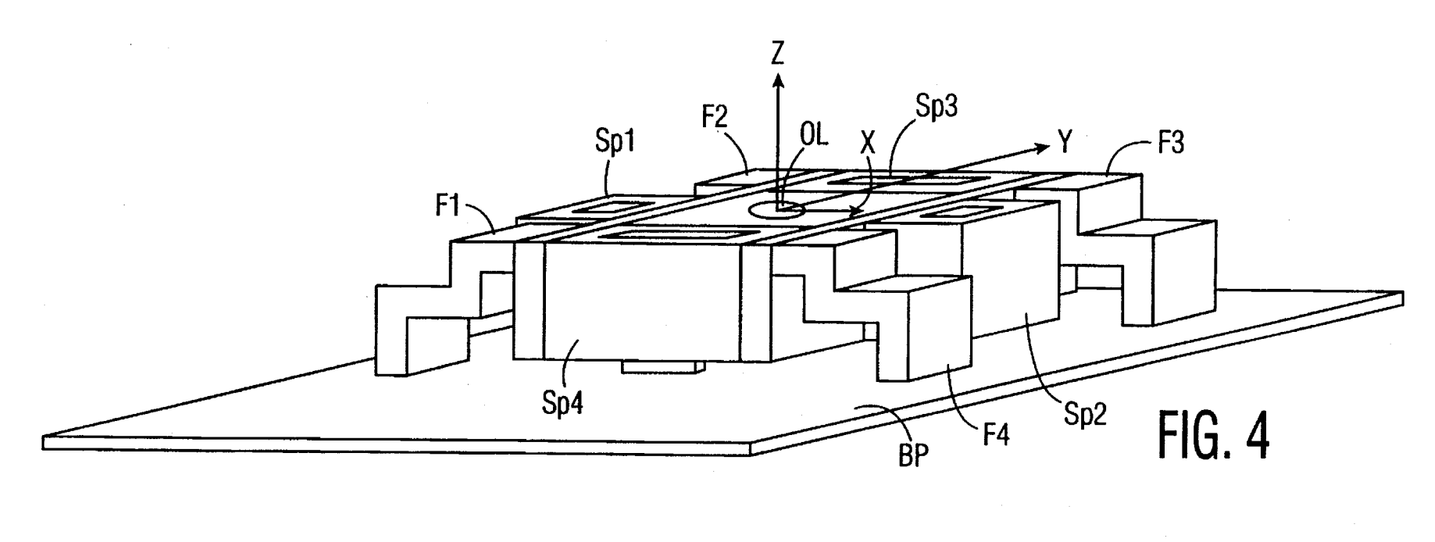
Figure 5A:
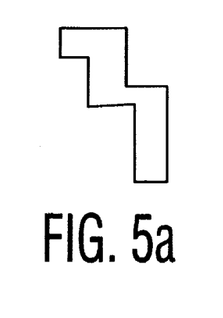
Figure 5B:
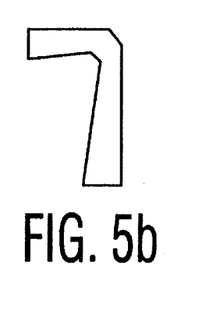
Figure 5C:
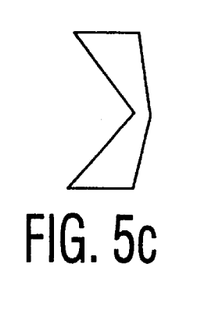
Figure 5D:
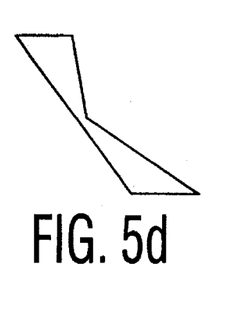
Figure 5E:
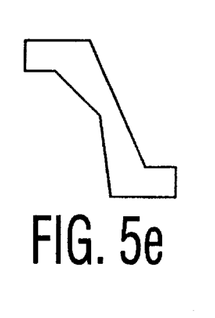

In particular for applications in which in normal operation, deviations with regard to the angle below which a light beam scans the recording medium AT can be permitted, there is provided an embodiment of the invention sketched in FIG. 4. For the compliant support of the carrier T accommodating the objective lens OL, there are provided four resilient moulded parts F1 ... F4 which are oppositely arranged, symmetrically of the objective lens OL, at the ends of the sides of the rectangular carrier T. The resilient moulded parts F1 ... F4 are fashioned in step-like manner analogously to the previously described embodiment of the invention and connect the carrier T to the base plate BP in a corresponding manner. Due to the four resilient moulded parts F1 ... F4 which are arranged symmetrically, a more even, mechanically effective elasticity is achieved, in particular with respect to different deflections. Four coils Sp1 ... Sp4 are likewise arranged symmetrically of the optical axis of the objective lens OL, which coils are provided for the deflection of the objective lens OL in the focusing direction z as well as for the setting of angles in the planes which the radial direction x and the tangential direction y form with the focusing direction z. The guidance of the actuator to places on the recording medium AT deviating from an actual position of the actuator is provided here exclusively by adjusting the tilt angle of the objective lens OL, which is effected by the coils Sp1 ... Sp4 to which a respective permanent magnet is allocated. The deflection in the focusing direction z is effected by controlling in the same sense two of the four coils Sp1 ... Sp4, whilst an adjustment of the tilt angle is undertaken by controlling one of the coils Sp1 ... Sp4 or by controlling in opposite senses two oppositely located ones of the coils Sp1 ... Sp4. However, combinations of resilient moulded parts F having manoeuvering means which deviate from this embodiment, are also realisable. The elasticity of the resilient moulded parts F is determined both by the properties of their materials as well as by their design. Based upon this, examples for the design of the resilient moulded parts F are given in FIG. 5 a ... e which take into account in a special manner, the properties of the materials and also the desired damping characteristic as well as the manner of attachment to the carrier T and to the base plate BP. Thus, in accordance with FIG. 5 a, for a comparable modulus of elasticity, a greater elasticity is achieved by reducing the cross-section of the lower tread and reducing the length of the tread of a step-like resilient moulded part F and, in correspondence with FIG. 5 b, a lower elasticity is achieved by reducing the number of steps. Resilient moulded parts F are indicated in FIG. 5 c ... e in which the contact faces, at which the connection of the resilient moulded part F to the carrier T and the base plate BP is provided, run parallel to one another. The elasticity of the resilient moulded parts F due to the material is supplemented, in a constructional manner, by the constrictions or notches that are provided and the contact faces may be provided both perpendicular to and parallel to the planes of the carrier T or base plate BP.

Figure 6:
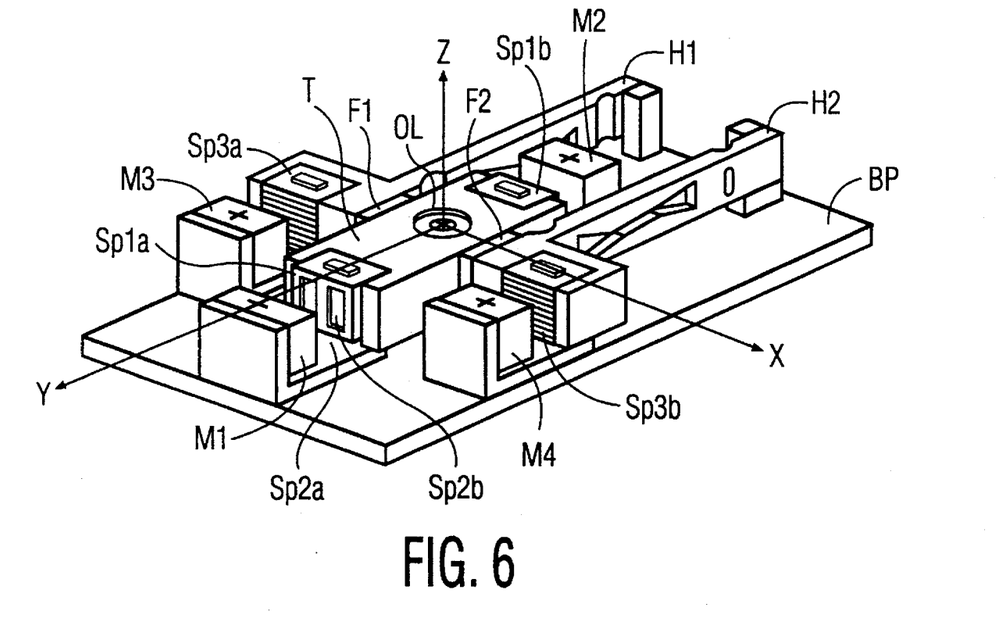
Figure 7:
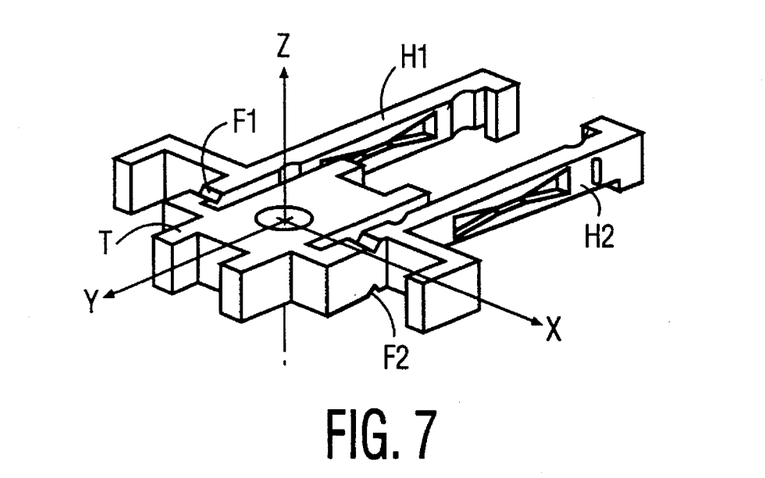

In further embodiments of the invention, resilient moulded parts F are advantageously combined with a parallel guidance of an actuator known in accordance with DE 39 24 190 A1 or resilient moulded parts F are integrated into the parallel guide. In correspondence with FIG. 6, the carrier T and the holding devices H1, H2 in accordance with DE 39 24 190 A1 forming the parallel guide are connected together via resilient moulded parts F1, F2. Thereby, in cotrast with the guide having the parallel guidance which was originally intended to be as stable as possible, there is introduced an element which initially appears to be disadvantageous since its elasticity can lead to deviations. However, the elasticity of the resilient moulded part F has an advantageous effect in that manufacturing contingent tolerances or deviations, which are caused by the effects of high temperature, from the orientation of the actuator that was originally intended to be effected without any adjustment, can be subsequently corrected. The demands, and hence the associated costs, which have to be placed on the precision of the individual parts are reduced and moreover, by means of an appropriate regulation, a higher precision and flexibility can be achieved during the adjustment of the actuator relative to the recording medium AT. A generally known coil arrangement, which is disposed opposite the permanent magnets, is used as the manoeuvering means. Departing therefrom however, divided coils Sp1$a$, Sp1$b$ are used, which coils are connected in series and provide for a control in the focusing direction z that is as linear as possible. Two further coils Sp2$a$, Sp2$b$, which serve for the control in the radial direction x, are respectively arranged on the coils Sp1$a$, Sp1$b$. The joints, which are effective as hinges, of the holding devices forming the parallel guide ensure a linear movement of the actuator in the focusing direction z and in the radial direction x. A rotational movement in the plane including the tangential direction y and the focusing direction z or about the radial direction x is achieved by a difference in the manner of controlling the coils Sp1a, Sp1b whose series circuit exhibits a centre tap for this purpose. For a rotational movement in the plane formed by the radial direction x and the focusing direction z i.e. about the tangential direction y, the coils Sp3a, Sp3b are controlled differently. An adjusting device having a member that is to be exclusively electrically controlled, is produced which can be used for a once-only automatic matching for ensuring, in normal operation, a constant perpendicular positioning of the actuator relative to the recording medium AT using constant control voltages corresponding to the matching process or in connection with a regulation. The resilient moulded parts F1, F2 are, in correspondence with FIG. 6, resilient rectangular parallelepiped blocks of synthetic material. Advantageously however, in a further embodiment corresponding to FIG. 7, they may also be formed by notches in the vicinity of the connections between the holding devices H1, H2 and the carrier T. The arrangement consisting of the holding devices H1, H2, the resilient moulded parts F1, F2 and the carrier T is then made, in correspondence with FIG. 7, from a single piece of synthetic material.

Figure 8:
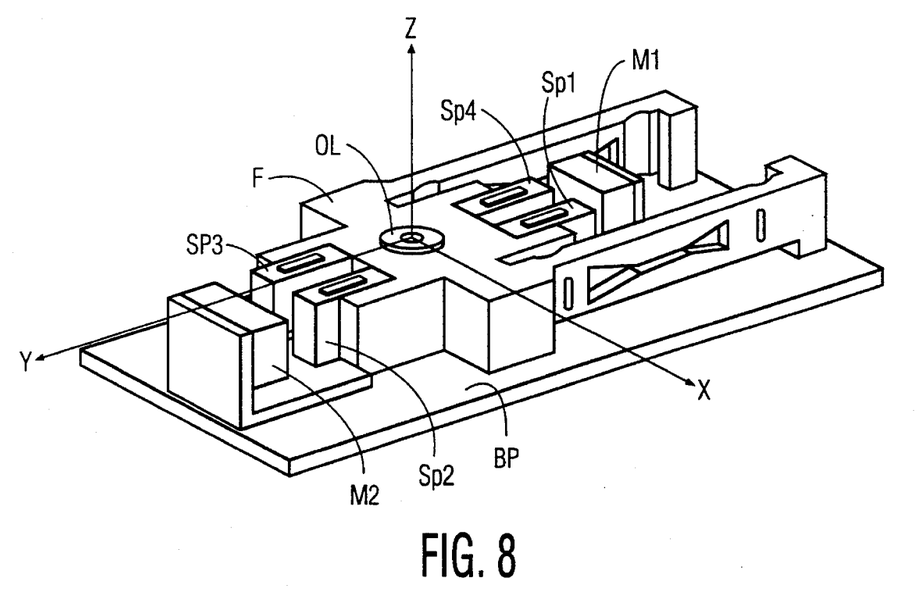
Figure 9:
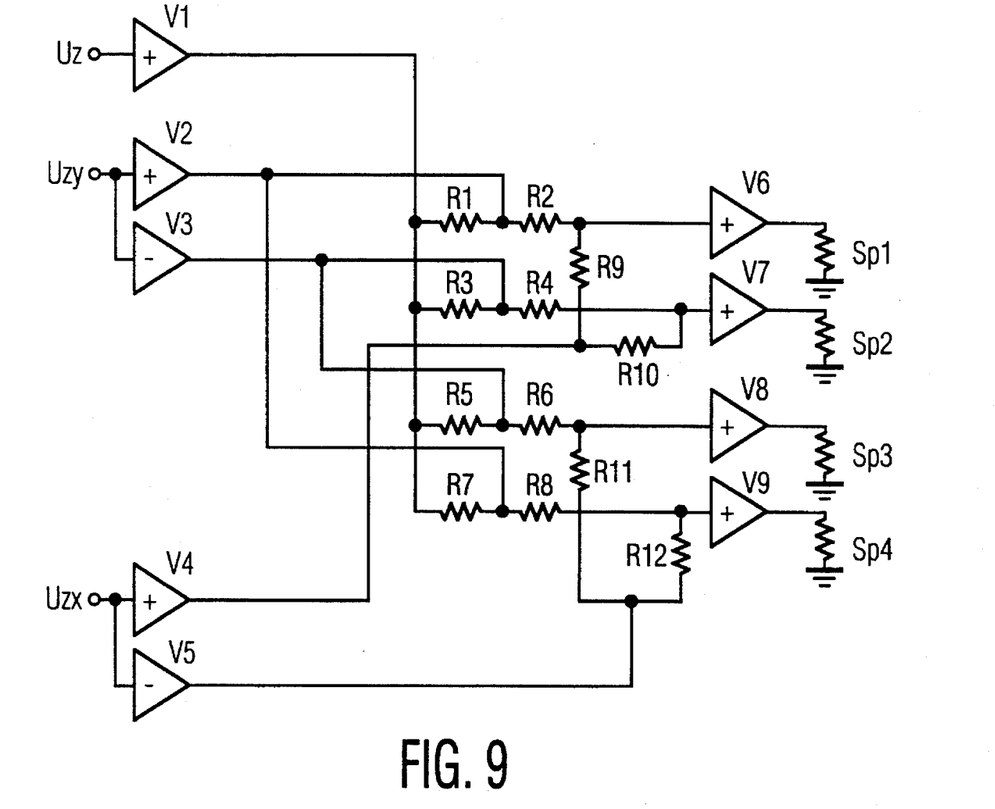

In a further embodiment of the invention in accordance with FIG. 8, a resilient moulded part F, which amalgamates the previously mentioned holding devices H1, H2 and the carrier T, is provided for the guidance of the objective lens OL. In contrast to the holding devices known in accordance with DE 39 24 190 A1 in which mobility is exclusively desired in the joints formed by notches, there is provided, for the arrangement in correspondence with FIG. 8, a material that also exhibits elasticity away from these notches which then makes it especially possible to tilt the objective lens O1 without additional notches in the vicinity of the connections between the holding devices H1, H2 and the carrier T such as are provided in accordance with FIG. 7. Only one resilient moulded part F, which is combined with a number of active manoeuvering means that corresponds to the intended deflections, is required as the compliant support for the objective lens OL. The embodiment corresponding to FIG. 8 is, analogously to the embodiment corresponding to FIG. 4, provided for a linear deflection in the focusing direction z and for rotational movements about the radial direction x and also the tangential direction y. Four coils Sp1 . . . Sp4 are disposed symmetrically with respect to the objective lens OL as the manoeuvering means, of which, two respective coils Sp1, Sp4 or Sp2, Sp3 are effective on a magnetic core formed by permanent magnets M1 or M2. Tilting movements are likewise achieved by means of different controls on the coils and the deflection in the focusing direction z is achieved by controlling all four coils Sp1 . . . Sp4. A circuit arrangement for controlling the actuator arrangement corresponding to FIG. 8 is given in FIG. 9. It consists of amplifiers V1 . . . V9, resistors R1 . . . R12 and the coils Sp1 . . . Sp4 forming the active manoeuvering means. For the adjustment of the actuator, regulating voltages derived by known methods from the scanning signal are used: Uz for the control in the focusing direction z, Uzy for rotational movements about the radial direction x and Uzx for rotational movements about the tangential direction y. The regulating voltage Uz is supplied equally to the four coils Sp1 . . . Sp4 via the non-inverting amplifier V1 and a respective series circuit consisting of two resistors R1, R2; R3, R4; R5, R6; R7, R8 with a respective non-inverting amplifier V6, V7, V8, V9. The regulating voltage Uzy for the production of a rotational movement about the radial direction x is supplied to the connection points of the respective two resistors R1, R2; R3, R4; R5, R6; R7, R8 connected in series, corresponding respectively to one of the coil pairs Sp2, Sp3 and Sp1, Sp4 which are provided in pairs, via the non-inverting amplifier V2 or the inverting amplifier V3. Analogously, there are provided a non-inverting amplifier V4 and an inverting amplifier V5 which are connected to the regulating voltage Uzx for the production of a rotational movement about the tangential direction y and which feed a signal corresponding to the regulating voltage Uzx into the amplifiers V6 . . . V9 connected to the coils Sp1 . . . Sp4 via respective resistors R9, R10 and R11, R12 connected thereto. The non-inverting amplifier V4 thereby feeds the oppositely located coils Sp1 and Sp2 in the coil pairs Sp1, Sp4 and Sp2, Sp3 via the resistors R9 and R10 and also the non-inverting amplifiers V6, V7. The coils Sp3 and Sp4 are connected via the non-inverting amplifier V8 and resistor R11 or the non-inverting amplifier V9 and resistor R12 to the inverting amplifier V5. If a linear deflection in the radial direction x is also wanted, further manoeuvering means can be provided so that a building block type of system is available which can be built up in accordance with the requirements. The actuator arrangement may, as described in the embodiments, receive a scanning head AK in the form of an objective lens OL in CD players, a scanning and/or recording head AK for re-writable recording media AT or else just a recording head AK.

We claim:

1. Apparatus for suspending a pickup head in a disc player or recorder comprising:

at least one symmetrically arranged resilient molded part having a step like shape and being resiliently deformable in at least one direction and through an angle in such a way that the head is deflectable both in straight lines and at least one angle relative to a plane defined by said straight lines.

2. Apparatus according to claim 1 wherein said resilient molded part is formed as a single piece which includes a compliant support and a scanning head carrier.

3. Apparatus according to claim 1 comprising:

a combination of two resilient molded parts having holding devices forming a parallel guide and molded parts arranged in connection between said two holding devices and a carrier.

4. Apparatus according to claim 1 comprising:

a planar member with an aperture for accommodating a scanning head, and resilient step-like members for connecting said planar member to a base.

5. An actuator arrangement for scanning and/or recording information which is recorded as a track or as tracks on a recording medium which is moved relative thereto using a scanning and/or recording head, including a carrier which accommodates the scanning and/or recording head and which is connected via a compliant support to a base plate said scanning and/or recording head is deflectable by maneuvering means connected to a control device and both said compliant support and said maneuvering means guide the scanning and/or recording head in a position with respect to the recording medium, said actuator arrangement is improved by said compliant support having at least one resilient molded part which is formed from a synthetic material or rubber in a step-like symmetric arrangement and is resiliently deformable in at least one direction and through an angle in such a way that the scanning and/or recording head is deflectable in straight lines parallel and normal to said recording medium and in multidimensional angles and said maneuvering means are equal in number to at least two linear deflection dimensions plus one for angular compensation.

6. Actuator arrangement in accordance with claim 5, characterised in that, the active maneuvering means are coils that are arranged on the carrier or on the resilient moulded part which simultaneously forms the carrier and that are connected to a control or regulating device, with which coils there is associated at least one respective permanent magnet as a passive maneuvering means.

7. Arrangement in accordance with claim 6, characterised in that, for deflecting the scanning and/or recording head in the focusing direction and through angles in the planes which the focusing direction forms with the radial direction and the tangential direction there are provided four individually controllable coils which are arranged in pairs symmetrical to the tangential direction and symmetrical to the radial direction.

8. Arrangement in accordance with claim 7, characterised in that, the distance between the coils which are arranged in pairs symmetrical to the tangential direction is smaller than the distance between the coils which are arranged in pairs symmetrical to the radial direction.

9. Actuator arrangement in accordance with claim 5, characterised in that, the compliant resilient support is formed from a combination of two resilient molded parts having two holding devices forming a parallel guide and the resilient moulded parts are arranged in the connection between the holding devices and the carrier.

10. Actuator arrangement in accordance with claim 5, characterised in that, the resilient molded part is formed as a single piece which incorporates both the compliant support as well as accommodating the carrier.

* * * * *

UNITED STATES PATENT AND TRADEMARK OFFICE
CERTIFICATE OF CORRECTION

PATENT NO. : 5,500,845

DATED : March 19, 1996

INVENTOR(S) : Hans-Robert Kuhn et al.

It is certified that error appears in the above-identified patent and that said Letters Patent is hereby corrected as shown below:

In Column 10, Claim 3, line 40, after "molded parts having"

insert ---two---

Signed and Sealed this

Thirtieth Day of September, 1997

Attest:

Attesting Officer

BRUCE LEHMAN

Commissioner of Patents and Trademarks